US010613881B2

(12) United States Patent
Lee et al.

(10) Patent No.: US 10,613,881 B2
(45) Date of Patent: Apr. 7, 2020

(54) STORAGE DEVICE, A HOST SYSTEM INCLUDING THE STORAGE DEVICE, AND A MAP TABLE UPDATING METHOD OF THE HOST SYSTEM

(71) Applicant: SAMSUNG ELECTRONICS CO., LTD., Suwon-si, Gyeonggi-do (KR)

(72) Inventors: TaeHack Lee, Hwaseong-si (KR); Je-Hyuck Song, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 166 days.

(21) Appl. No.: 14/996,562

(22) Filed: Jan. 15, 2016

(65) Prior Publication Data

US 2016/0267016 A1 Sep. 15, 2016

(30) Foreign Application Priority Data

Mar. 9, 2015 (KR) ........................ 10-2015-0032477

(51) Int. Cl.
*G06F 12/10* (2016.01)
*G06F 9/455* (2018.01)
*G06F 13/28* (2006.01)
*G06F 12/109* (2016.01)

(52) U.S. Cl.
CPC ............ *G06F 9/455* (2013.01); *G06F 12/109* (2013.01); *G06F 13/28* (2013.01)

(58) Field of Classification Search
CPC ................................ G06F 13/28; G06F 12/109
See application file for complete search history.

(56) References Cited

U.S. PATENT DOCUMENTS

| 6,822,654 | B1* | 11/2004 | Trivedi ............... G06F 13/1668 345/519 |
| 7,577,764 | B2 | 8/2009 | Arndt et al. |
| 7,679,133 | B2 | 3/2010 | Son et al. |
| 8,141,092 | B2 | 3/2012 | Brown et al. |
| 8,144,582 | B2 | 3/2012 | Brown et al. |
| 8,196,144 | B2* | 6/2012 | Kagan ................ G06F 9/45558 718/104 |
| 8,495,292 | B2 | 7/2013 | Flynn et al. |
| 8,553,466 | B2 | 10/2013 | Han et al. |
| 8,554,973 | B2 | 10/2013 | Tanaka et al. |
| 8,559,235 | B2 | 10/2013 | Yoon et al. |
| 8,589,723 | B2 | 11/2013 | Kumar et al. |

(Continued)

OTHER PUBLICATIONS

14996562, NPL IEEE Xplore search; Nov. 21, 2019 (Year: 2019).*
14996562, NPL Google search; Nov. 20, 2019 (Year: 2019).*

*Primary Examiner* — Charles Rones
*Assistant Examiner* — Tian-Pong Chang
(74) *Attorney, Agent, or Firm* — F. Chau & Associates, LLC

(57) ABSTRACT

A host system includes a host device, a host buffer memory, and storage device. The host device includes a plurality of cores. The host buffer memory is configured to store a first command queue and a first map table, wherein each of the first command queue and the first map table corresponds to a first core of the cores. The storage device is configured to perform an input/output virtualization operation using the first core as a virtual core. The storage device uses the first command queue and the first map table during the input/output virtualization operation using the first core.

20 Claims, 13 Drawing Sheets

(56) References Cited

U.S. PATENT DOCUMENTS

| | | | |
|---|---|---|---|
| 8,631,201 B2 | 1/2014 | Koshiyama | |
| 8,635,616 B2 | 1/2014 | Yang et al. | |
| 8,654,587 B2 | 2/2014 | Yoon et al. | |
| 8,832,354 B2 | 9/2014 | Sokolov et al. | |
| 8,887,139 B2 | 11/2014 | Park et al. | |
| 2003/0046359 A1* | 3/2003 | Betz | G06F 13/385 709/216 |
| 2006/0053246 A1* | 3/2006 | Lee | G06F 9/4403 711/100 |
| 2007/0260754 A1* | 11/2007 | Irish | G06F 12/1027 710/3 |
| 2008/0071982 A1* | 3/2008 | Kanno | G06F 3/0605 711/112 |
| 2008/0183882 A1 | 7/2008 | Flynn et al. | |
| 2011/0233648 A1 | 9/2011 | Seol et al. | |
| 2011/0296088 A1 | 12/2011 | Duzly et al. | |
| 2012/0265916 A1* | 10/2012 | Nordstrom | G06F 13/28 710/308 |
| 2013/0042056 A1* | 2/2013 | Shats | G06F 12/0246 711/103 |
| 2013/0151908 A1 | 6/2013 | Iwanaga et al. | |
| 2014/0016648 A1* | 1/2014 | Hidaka | H04L 49/15 370/400 |
| 2014/0040527 A1* | 2/2014 | Kanigicherla | G06F 13/4022 710/316 |
| 2014/0059295 A1 | 2/2014 | Northcutt et al. | |
| 2014/0068201 A1* | 3/2014 | Fromm | G06F 12/0828 711/148 |
| 2014/0173149 A1* | 6/2014 | Walker | G06F 9/45533 710/263 |
| 2014/0259015 A1* | 9/2014 | Chigusa | G06F 9/45558 718/1 |
| 2014/0281040 A1 | 9/2014 | Liu | |
| 2014/0281072 A1* | 9/2014 | Yang | G06F 13/4295 710/106 |
| 2015/0234601 A1* | 8/2015 | Tsai | G06F 3/0611 711/103 |
| 2016/0300609 A1* | 10/2016 | Han | G11C 16/26 |

* cited by examiner

STORAGE DEVICE, A HOST SYSTEM INCLUDING THE STORAGE DEVICE, AND A MAP TABLE UPDATING METHOD OF THE HOST SYSTEM

CROSS-REFERENCE TO RELATED APPLICATIONS

This U.S. non-provisional patent application claims priority under 35 U.S.C. § 119 to Korean Patent Application No. 10-2015-0032477, filed on Mar. 9, 2015, in the Korean intellectual Property Office, the disclosure of which is incorporated by reference herein in its entirety.

TECHNICAL FIELD

The present inventive concept relates to a storage device, more particularly, to a host system including the storage device and a map table updating method of the host system.

DISCUSSION OF THE RELATED ART

Various types of electronic devices have been used and some electronic devices may solely perform their own unique functions while exchanging data with other electronic devices through an input/output interface. As various types of electronic devices emerge, types of input/output interface protocols have been diversified.

SUMMARY

According to an exemplary embodiment of the present inventive concept, a host system is provided. The host system includes a host device, a host buffer memory, and storage device. The host device includes a plurality of cores. The host buffer memory is configured to store a first command queue and a first map table, wherein each of the first command queue and the first map table corresponds to a first core of the cores. The storage device is configured to perform an input/output virtualization operation using the first core as a virtual core. The storage device uses the first command queue and the first map table during the input/output virtualization operation using the first core.

The host device and the storage device may communicate with each other through a virtualization interface that supports the input/output virtualization operation.

The virtualization interface may be at least one of nonvolatile memory express (NVMe), peripheral component interconnect express queuing interface (PQI), serial advanced technology attachment express (SATAe), or low latency interface (LLI).

The first command queue may include a submission queue for storing a command request and a completion queue for storing a response of a result of the command request.

The host device may further include a graph processing unit, and the host buffer memory may further store a second command queue and a second map table used for an input/output virtualization operation using the graphic processing unit.

The host device may further include a modem processor. The modem processor may perform a wired or wireless communication. The host buffer memory may further store a third command queue and a third map table used for an input/output virtualization operation using the modem processor.

The host system may further include a modem chip including a modem processor. The modem chip may be disposed outside of the host device. The modem processor may perform a wired or wireless communication. The host buffer memory may further store a fourth command queue and a fourth map table used for an input/output virtualization operation using the modem processor.

The storage device may include a virtualization interface circuit, an address translation unit, a direct memory access, and at least one processor. The virtualization interface circuit may be configured to communicate with the host device and control the input/output virtualization operation. The address translation unit may be configured to support access of the storage device to the host buffer memory, set an address corresponding to an area of the host buffer memory, and provide the set address to the direct memory access circuit as a translated address. The direct memory access circuit may be configured to write or read data into or from the host buffer memory based on the translated address. The at least one processor may be configured to control an overall operation of the storage device.

The virtualization interface circuit may include a physical function controller and a plurality of virtual function controllers. The physical function controller may be configured to control an input/output operation using the at least one processor of the storage device in a first command queue manner. Each of the plurality of virtual function controllers may be configured to control an input/output virtualization operation using a corresponding one of the cores of the host device as a virtual core in a second command queue manner.

The direct memory access circuit may include a write direct memory access circuit and a read direct memory access circuit. The write direct memory access circuit may be configured to support a data write operation of writing data into the host buffer memory. The read direct memory access circuit may be configured to support a data read operation of reading data from the host buffer memory.

The storage device may further include a buffer memory. The buffer memory may be configured to store a portion of the first command queue and a portion of the first map table stored in the host buffer memory or to store data input/output during the input/output virtualization operation.

According to an exemplary embodiment of the present inventive concept, a storage device is provided. The storage device includes at least one nonvolatile memory device and a memory controller. The memory controller is configured to control the at least one nonvolatile memory device. The memory controller includes an error correction circuit, a direct memory access circuit, an address translation circuit, a host interface circuit, and a nonvolatile memory interface circuit. The error correction circuit is configured to correct an error of data output from the at least one nonvolatile memory device. The direct memory access circuit is configured to directly access a processor, and to write data into an external host buffer memory. The address translation circuit is configured to set an address corresponding to an area of the external host buffer memory according to a request of the direct memory access circuit. The host interface circuit is configured to communicate with an external host device in a command queue manner. The host interface circuit includes a physical function controller and a plurality of virtual function controllers. The physical function is configured to control an input/output operation using the processor. Each of the plurality of virtual function controllers is configured to control an input/output virtualization operation using a corresponding one of a plurality of cores of the external host device. The nonvolatile memory interface circuit is configured to perform interfacing with the at least one nonvolatile memory device. The input/output virtualization operation includes translating a logical address into a physical address using a map table read from the host buffer memory.

The storage device may further include a buffer memory. The buffer memory may be configured to store a command queue and a portion of the map table of the host buffer memory. The buffer memory may be a static random access memory (SRAM).

According to an exemplary embodiment of the present inventive concept, a method for updating a map table of a storage device is provided. The method includes receiving a write command, determining whether a map table needs to be updated when a write operation is performed according to the write command, reading the map table from an external host buffer memory using a direct memory access circuit when it is determined that the map table needs to be updated, and updating the read map table to at least one nonvolatile memory device.

The reading of the map table may include setting an address corresponding to an area of the host buffer memory in which the map table is stored, through an address translation unit.

According to an exemplary embodiment of the present inventive concept, a storage host system is provided. The storage host system includes a host device, a host buffer memory, and a storage device. The host device includes a first core and a host buffer memory controller controlling the host buffer memory. The host buffer memory is configured to store first and second command queues, and first and second map tables. The storage device includes a memory device and a memory controller controlling the memory device. The storage device performs an input/output operation using at least one processor of the memory controller, and the storage device performs an input/output virtualization operation using the first core of the host device as a virtual core. The storage device uses the first command queue and the first map table during the input/output operation using the at least one processor. The storage device uses the second command queue and the second map table during the input/output virtualization operation using the first core.

The memory device may be a nonvolatile memory device.

The memory controller may further include a direct memory access circuit. The direct memory access may be configured to directly access a processor without bypassing the processor, and to write data into the host buffer memory. The address translation circuit may be configured to set an address corresponding to an area of the host buffer memory according to a request of the direct memory access circuit.

The memory controller may further include a host interface circuit. The host interface circuit may be configured to communicate with the host device in a command queue manner. The host interface circuit may include a physical function controller and a virtual function controller. The physical function controller may be configured to control the input/output operation using the at least one processor. The virtual function controller may be configured to control the input/output virtualization operation using the first core.

The host device may further include a graph processing unit. The host buffer memory may further store a third command queue and a third map table used for an input/output virtualization operation using the graphic processing unit.

BRIEF DESCRIPTION OF THE DRAWINGS

The forgoing and other features of the present inventive concept will be described in more detail with reference to the accompanying drawings, in which.

DETAILED DESCRIPTION OF THE EMBODIMENTS

Figure 1:
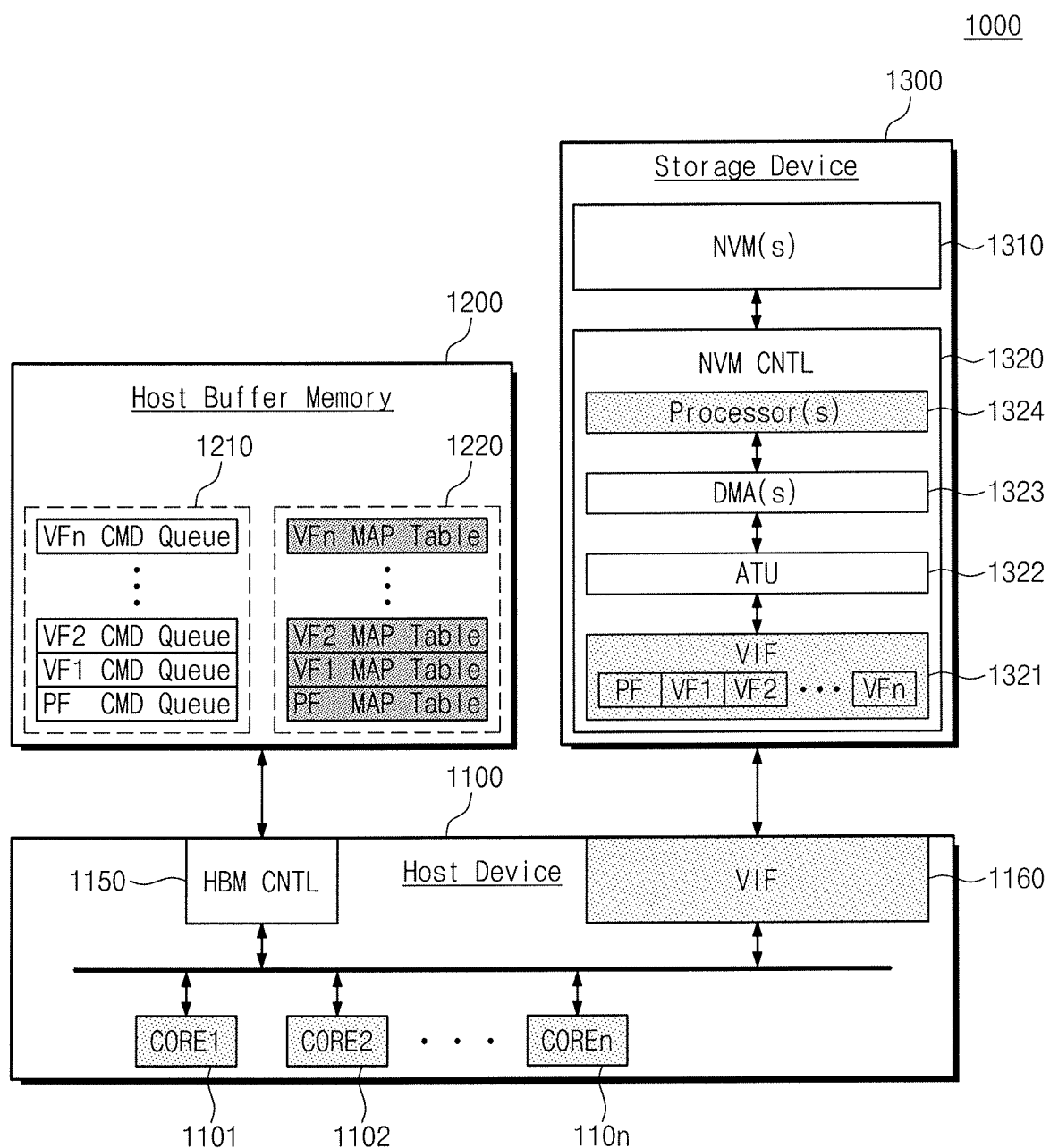
FIG. 1 illustrates a host system according to an exemplary embodiment of the present inventive concept.

Exemplary embodiments of the present inventive concept will be described more fully with reference to the accompanying drawings. Exemplary embodiments of the present inventive concept may, however, be embodied in many different forms and should not be construed as being limited to the embodiments set forth herein. In the drawings, the sizes and the thicknesses of layers and regions may be exaggerated for clarity. Like numbers may refer to like elements throughout the written descriptions and drawings.

As used herein, the term "and/or" includes any and all combinations of one or more of the associated listed items.

As used herein, the singular forms "a", "an" and "the" are intended to include the plural forms as well, unless the context clearly indicates otherwise.

FIG. 1 illustrates a host system 1000 according to an exemplary embodiment of the present inventive concept. As illustrated in FIG. 1, the host system 1000 includes a host device 1100, a host buffer memory 1200, and a storage device 1300. The host system 1000 may support a virtualization function. For example, the host system 1000 may support an input/output virtualization (IO virtualization) function. The storage device 1300 may use at least one of cores 1101 to 110$n$ (here, n is an integer greater than or equal to 2) of the host device 1100 as a virtual core during an input/output operation. In an exemplary embodiment, the IO virtualization function may be a single root (SR) IO virtualization function, a multi-root (MR) IO virtualization function, or the like.

The host device 1100 may be configured to control the overall operation of the host system 1000. For example, the host device 1100 may be an application processor, a modem-integrated application processor, a system-on-chip (SoC), an integrated circuit, or the like. The host device 1100 may include the cores 1101 to 110n, a host buffer memory controller (HBM CNTL) 1150, and a virtualization interface circuit (VIF) 1160 that are connected to at least one bus.

Each of the cores 1101 to 110n may be used as a virtual core during an input/output virtualization operation.

The host buffer memory 1200 may be configured to temporarily store data required for the operation of the host system 1000. For example, the host buffer memory 1200 may store command queues 1210 and map tables 1220 that are required to perform an input/output function of the host system 1000.

The command queues 1210 may include at least one physical function command queue (e.g., PF CMD Queue) and a plurality of virtual function command queues (e.g., VF1 CMD queue to VFn CMD Queue). In an exemplary embodiment, some queues (e.g., PF CMD Queue) of the command queues 1210 may be used in at least one processor 1324 of the storage device 1300. In an exemplary embodiment, some command queues (e.g., VF1 CMD Queue to VFn CMD Queue) of the command queues 1210 may be used in the cores 1101 to 110n of the host device 1100 required for the input/output virtualization.

The map table 1220 may include a physical function map table (e.g., PF MAP Table) and a plurality of virtual function map tables (e.g., VF1 Map Table to VFn MAP Table). In an exemplary embodiment, a portion (e.g., PF MAP Table) of the map table 1220 may be used for address translation (e.g., translation between a logical address and a physical address) during an input/output operation of the storage device 1300. In an exemplary embodiment, portions (e.g., VF1 MAP Table to VFn MAP table) of the map table 1220 may be used for address translation during an input/output virtualization operation.

In an exemplary embodiment, the map table 1220 may be updated to a memory device 1310 in the storage device 1300 periodically or as desired. In an exemplary embodiment, the map table 1220 may be updated to a memory device 1310 according to a user' request. In an exemplary embodiment, the map table 1220 may be updated to a memory device 1310 according to a policy of the host device 1000 or a policy of the storage device 1300.

In an exemplary embodiment, the virtualization interface circuit 1160 may be implemented according to a virtualization interface protocol that supports the input/output virtualization function. For example, the virtualization interface circuit 1160 may be implemented with at least one of serial advanced technology attachment express (SATAe), peripheral component interconnect express (PCIe), PCIe queuing interface (PQI), small computer system interface (SCSI) over PCIe (SOP), nonvolatile memory express (NVMe), small computer system interface express (SCSIe), low latency interface (LLI), and universal flash storage (UFS) host controller interface (HCI).

The storage device 1300 includes at least one nonvolatile memory device (NVM) 1310 and a memory controller (NVM CNTL) 1320 that controls the nonvolatile memory device 1310. The storage device 1300 may be configured to directly access the host buffer memory 1200 or to support the input/output virtualization function. In an exemplary embodiment, the storage device 1300 may be implemented with at least one of a solid state drive (SSD), an embedded multimedia card (eMMC), an MMC, a secure digital (SD) card, a micro SD, a mini SD, and universal flash storage (UFS), each of which includes a nonvolatile memory.

The nonvolatile memory device 1310 may be a NAND flash memory, a vertical NAND (VNAND) flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like.

In an exemplary embodiment of the present inventive concept, the nonvolatile memory device 1310 may be implemented with a three-dimensional (3D) array structure. In an exemplary embodiment of the present inventive concept, a three-dimensional (3D) memory array is provided. The 3D memory array is monolithically formed as one or more physical levels in arrays of memory cells having an active area which is disposed above a silicon substrate and circuitry. Here, the circuitry may be associated with the operation of the memory cells and may be disposed above the silicon substrate or within the silicon substrate. The term "monolithic" may be understood to mean that layers of each physical level of the array are directly deposited on the layers of each underlying level of the array.

In an exemplary embodiment of the present inventive concept, the 3D memory array includes vertical NAND strings that are vertically oriented such that at least one memory cell is disposed above another memory cell. The at least one memory cell may include a charge trap layer. Each vertical NAND string may include at least one select transistor disposed above memory cells. The at least one select transistor has substantially the same structure as the memory cells, and the at least one select transistor is formed monolithically together with the memory cells.

The following patent documents, U.S. Pat. Nos. 7,679,133, 8,553,466, 8,654,587, and 8,559,235, and U.S. Patent Publication No. 2011/0233648, describe exemplary configurations for 3D memory arrays, in which the 3D memory array is formed as a plurality of levels with word lines and/or bit lines shared between the levels. The aforementioned patents documents are herein incorporated by reference in their entireties. The nonvolatile memory device 1310 may be applied to a flash memory device in which a charge storage device includes a conductive floating gate and a charge trap flash (CTF) memory device in which a charge storage layer includes an insulating layer.

Referring to FIG. 1, the memory controller 1320 may include a virtualization interface circuit (VIF) 1321, an address translation unit (ATU) 1322, at least one direct memory access (DMA) circuit 1323, and at least one processor 1324.

The virtualization interface circuit 1321 may be configured to communicate with the virtualization interface circuit (VIF) 1160 of the host device 1110. The virtualization interface circuit 1321 may be implemented according to a virtualization interface that supports an input/output virtualization function. The virtualization interface circuit 1321 may include a physical function controller PF and a plurality of virtual function controllers VF1 to VFn (here, n is an integer greater than or equal to 2). The physical function controller PF may be configured to control an input/output operation using the processor 1324 of the storage device 1300 in a command queue manner. Each of the virtual function controllers VF1 to VFn may be configured to control an input/output virtualization operation using a corresponding one of the cores 1101 to 1101n of the host device 1100 as a virtual core in a command queue manner. For example, each of the virtual function controllers VF1 to VFn may correspond to each of the cores 1101 to 1101n.

The address translation unit 1322 of the storage device 1300 may support access of the host buffer memory 1200 to the storage device 1300. In an exemplary embodiment, the address translation unit 1322 of the storage device 1300 may support access of the storage device 1300 to the host buffer memory 1200. For example, the address translation unit 1322 may set an address, which is viewed by the storage device 1300, corresponding to a particular area of the host buffer memory 1200. In an exemplary embodiment, the address translation unit 1322 may provide the set address to the direct memory access circuit 1323 as a translated address (e.g., a physical address).

The DMA circuit 1323 may be configured to support direct access of the storage device 1300 to the host buffer memory 1200. For example, the DMA circuit 1323 may write or read data to or from the host buffer memory 1200 based on a physical address of the host buffer memory 1200 translated by the address translation unit 1322. In an exemplary embodiment, the DMA circuit 1323 may include a write DMA circuit that supports a data write operation of writing data into the host buffer memory 1200 or a read DMA circuit that supports a data read operation of reading data from the host buffer memory 1200.

The at least one processor 1324 may be configured to control the overall operation of the storage device 1300.

The host system 1000 may use the cores 1101 to 110n of the host device 1100 in performing an input/output virtualization operation and store the map table 1220 required for the input/output virtualization operation in the host buffer memory 1200, and thus, the overall system performance may be increased. For example, since the storage device 1300 uses the host buffer memory 1200 during a virtualization operation, the storage device 1300 might not include a high-capacity buffer memory. Thus, fabrication cost of the storage device 1300 may be reduced and a chip size may also be reduced.

Figure 2:
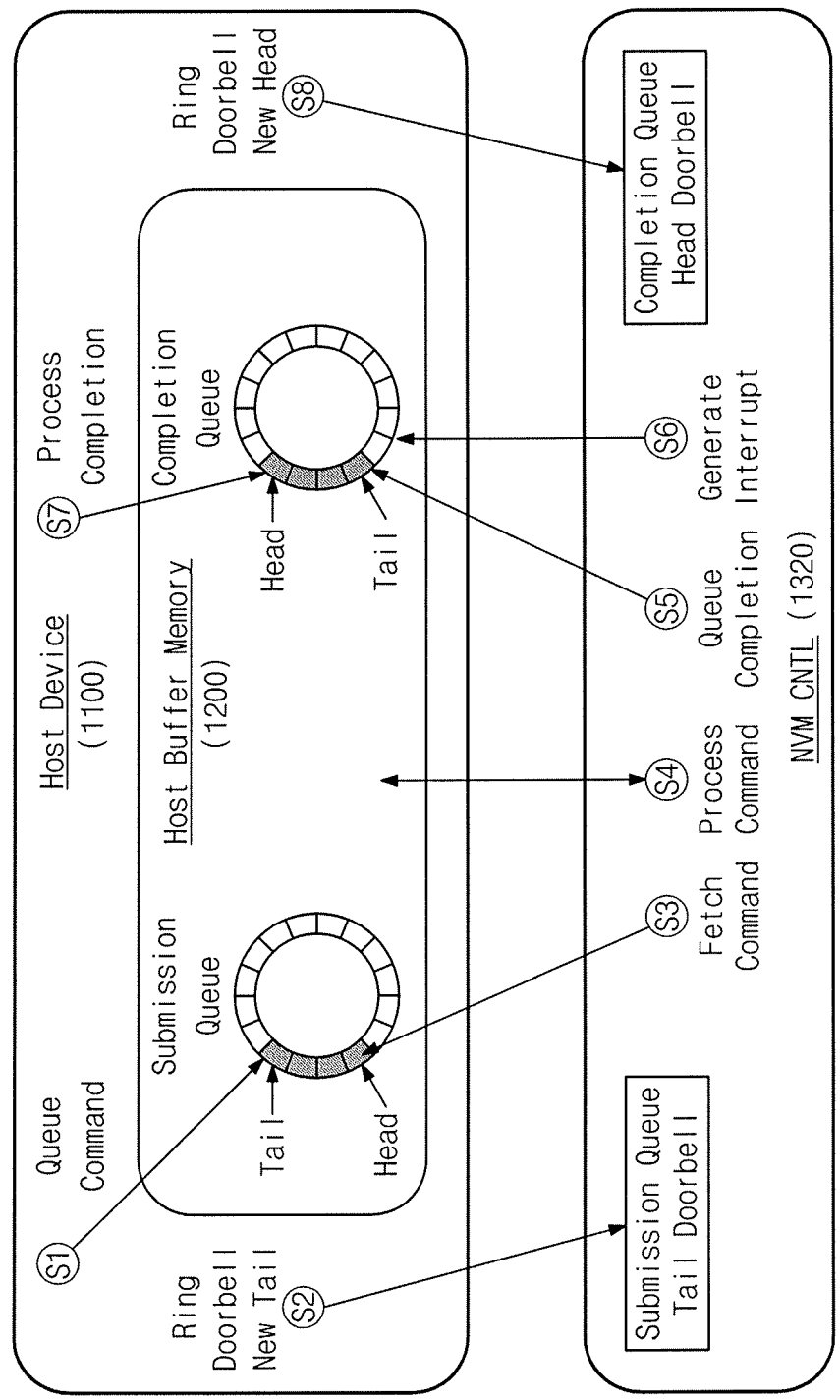
FIG. 2 illustrates a queue interface method for processing a command according to an exemplary embodiment of the present inventive concept.

FIG. 2 illustrates a queue interface method for processing a command according to an exemplary embodiment of the present inventive concept.

A command queue interface is performed based on a queue pair including a submission queue for command request and a completion queue for processing completion of a corresponding command. Referring to FIGS. 1 and 2, the host device 1100 writes a queue command into the submission queue (S1). The host device 1100 writes an updated submission queue tail pointer into a tail doorbell of the memory controller 1320 (S2). In an exemplary embodiment, the memory controller 1320 may be one of the physical function controller PF and the virtual function controllers VF1 to VFn shown in FIG. 1. The memory controller 1320 fetches a command from the submission queue (S3). The memory controller 1320 processes the fetched command (S4). The memory controller 1320 writes a completion into the completion queue after processing the fetched command (S5). The memory controller 1320 generates an MSI-X interrupt (S6). The host device 1100 processes completion of the command (S7). The host device 1100 writes an updated completion queue header pointer into a head doorbell of the memory controller 1320 (S8).

A host device according to an exemplary embodiment of the present inventive concept may include a graphic processing unit (GPU). A host system according to an exemplary embodiment of the present inventive concept may use the graphic processing unit (GPU) as a virtualization core.

Figure 3:
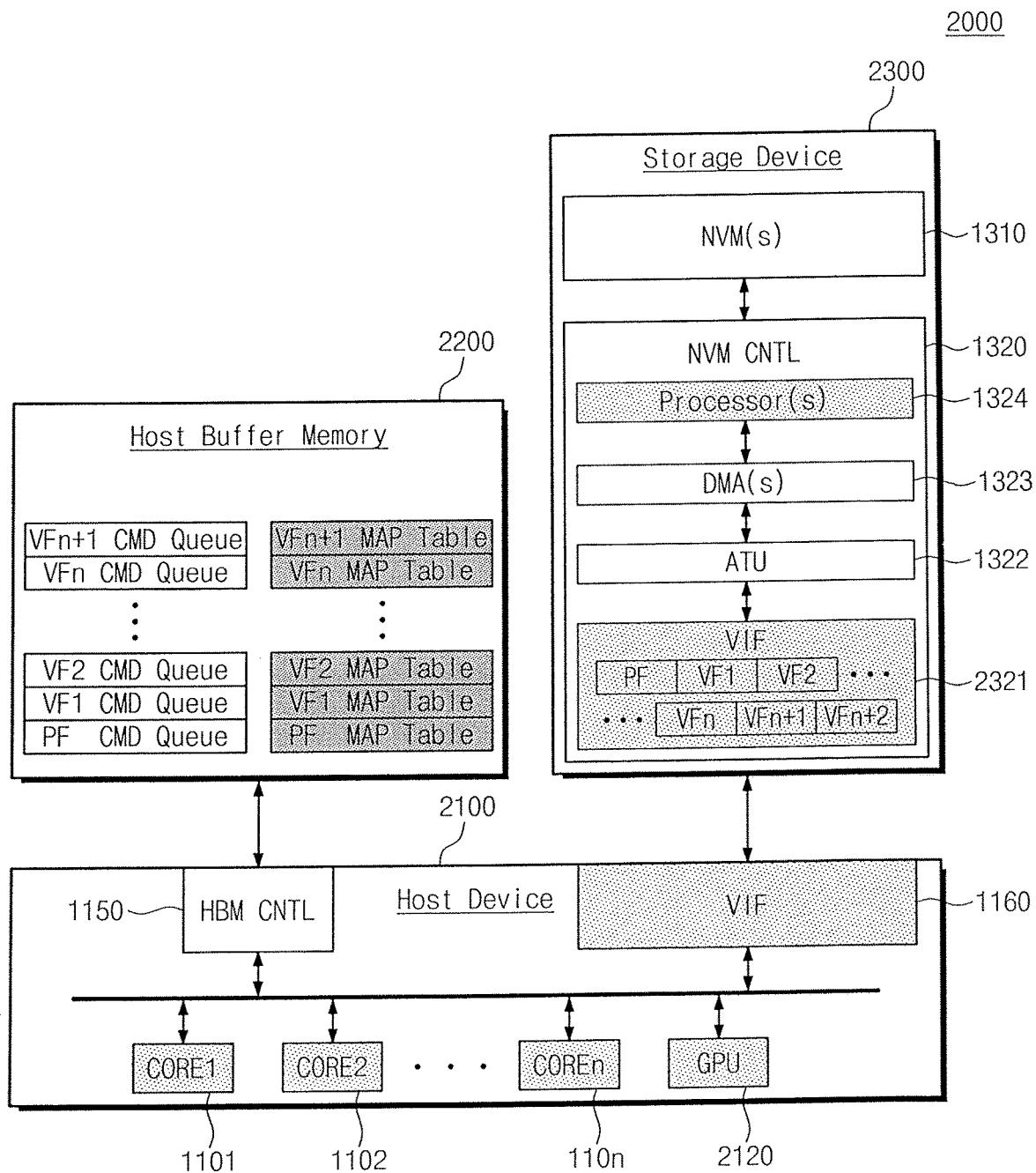
FIG. 3 illustrates a host system according to an exemplary embodiment of the present inventive concept.

FIG. 3 illustrates a host system 2000 according to an exemplary embodiment of the present inventive concept. The host system 2000 includes a host device 2100, a host buffer memory 2200, and a storage device 2300. In addition to the host device 1100 of FIG. 1, the host device 2100 further includes a graphic processing unit (GPU) 2120. In addition to the visualization interface circuit 1321 of the storage device 1300 of FIG. 1, a virtualization interface circuit 2321 of the storage device 2300 further includes a virtual function controller VFn+1 that supports a virtualization function of the GPU 2120. In addition to the host buffer memory 1200 of FIG. 1, the host buffer memory 2200 further includes a command queue VFn+1 CMD Queue and a map table VFn+1 MAP Table, both of which correspond to the virtualization function of the GPU 2120. For example, the host system 2000 of FIG. 3 may have substantially the same configuration and structure as those of the host system 1000 of FIG. 1 except for the aforementioned features of the host system 2000 of FIG. 3. Thus, duplicate descriptions will be omitted.

A host system according to an exemplary embodiment of the present inventive concept may use a modem processor as a virtualization core.

Figure 4:
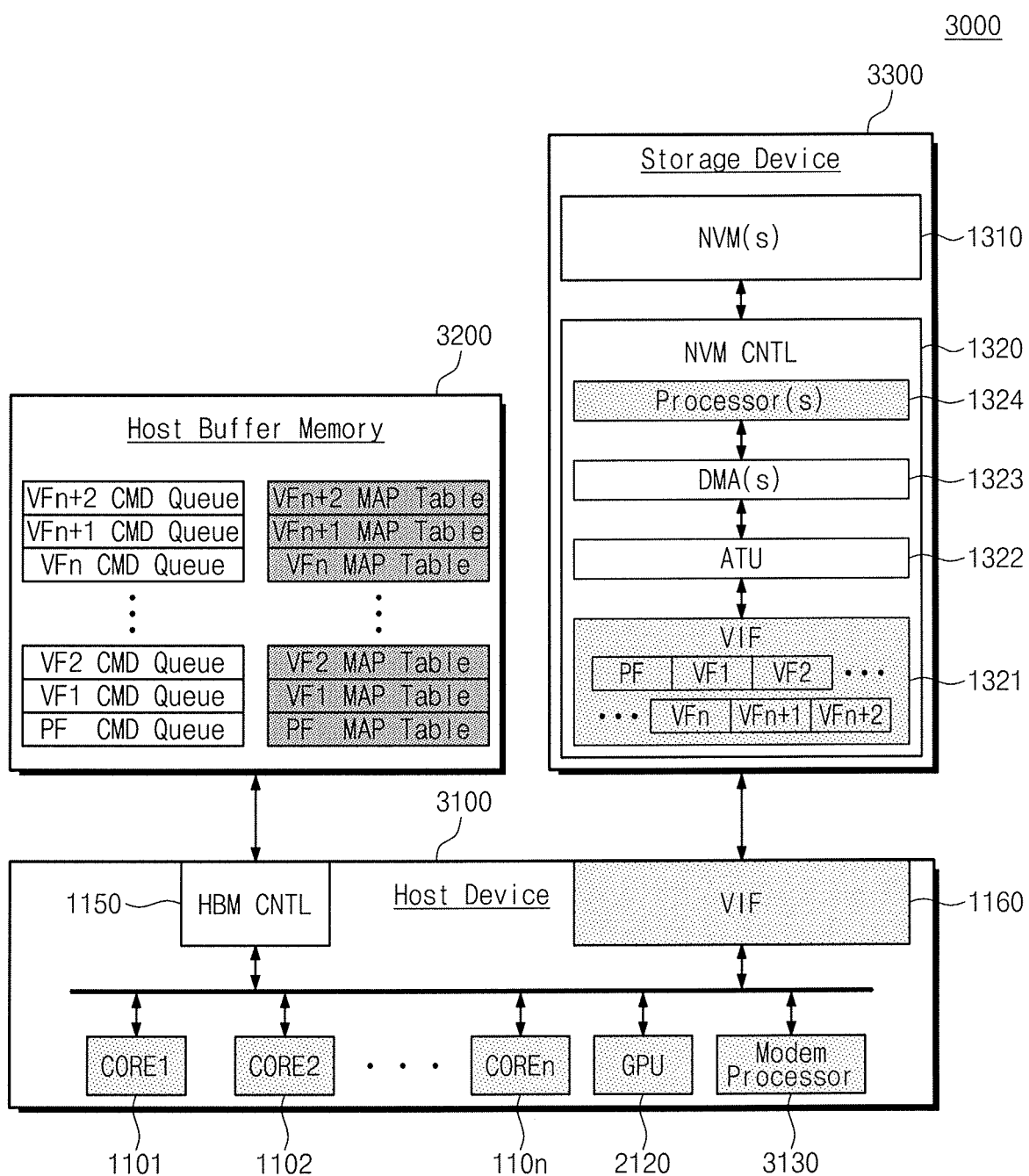
FIG. 4 illustrates a host system according to an exemplary embodiment of the present inventive concept.

FIG. 4 illustrates a host system 3000 according to an exemplary embodiment of the present inventive concept. The host system 3000 includes a host device 3100, a host buffer memory 3200, and a storage device 3300. In addition to the host device 2100 of FIG. 3, the host device 3100 further includes a modem processor 3130. In addition to the visualization interface circuit 2321 of the storage device 2300 of FIG. 3, a virtualization interface circuit 3321 of the storage device 3300 further includes a virtual function controller VFn+2 that supports a virtualization function of the modem processor 3130. In addition to the host buffer memory 2200 of FIG. 3, the host buffer memory 3200 further includes a command queue VFn+2 CMD Queue and a map table VFn+2 MAP Table, both of which correspond to the virtualization function of the modem processor 3130. For example, the host system 3000 of FIG. 4 may have substantially the same configuration and structure as those of the host system 2000 of FIG. 3 except for the aforementioned features of the host system 3000 of FIG. 4. Thus, duplicate descriptions will be omitted.

The host system 3000 shown in FIG. 4 has a structure where the modem processor 3130 is embedded in the host device 3100. However, the structure of the host system 3000 is not limited thereto. A host system according to an exemplary embodiment of the present inventive concept may include a modem chip disposed outside a host device.

Figure 5:
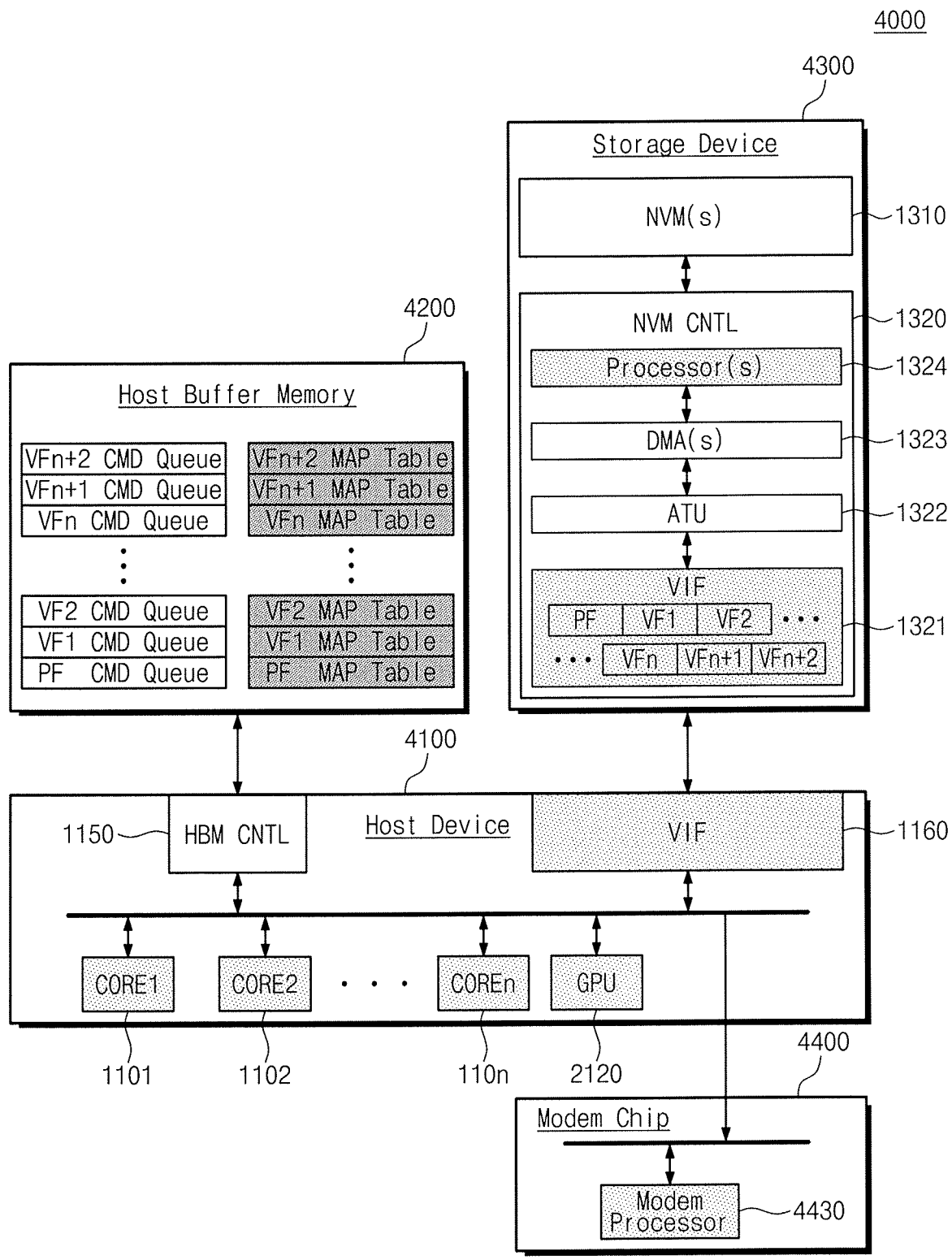
FIG. 5 illustrates a host system according to an exemplary embodiment of the present inventive concept.

FIG. 5 illustrates a host system 4000 according to an exemplary embodiment of the present inventive concept. The host system 4000 includes a host device 4100, a host buffer memory 4200, and a storage device 4300. In addition to the host device 2100 of FIG. 3, the host system 4000 further includes a modem chip 4400 including a modem processor 4430. The modem chip 4400 may be disposed outside the host device 4100. In addition to the visualization interface circuit 2321 of the storage device 2300 of FIG. 3, a virtualization interface circuit 4321 of the storage device 4300 further includes a virtual function controller VFn+2 that supports a virtualization function of the modem processor 4430. For example, the modem processor 3130 and 4430 may perform wired/wireless communication. In addition to the host buffer memory 2200 of FIG. 3, the host buffer memory 4320 further includes a command queue VFn+2 CMD Queue and a map table VFn+2 MAP Table, both of which correspond to the virtualization function of the modem processor 4430. For example, the host system 4000 of FIG. 5 may have substantially the same configuration and structure as those of the host system 2000 of FIG.

3 except for the aforementioned features of the host system 4000 of FIG. 5. Thus, duplicate descriptions will be omitted.

Figure 6:
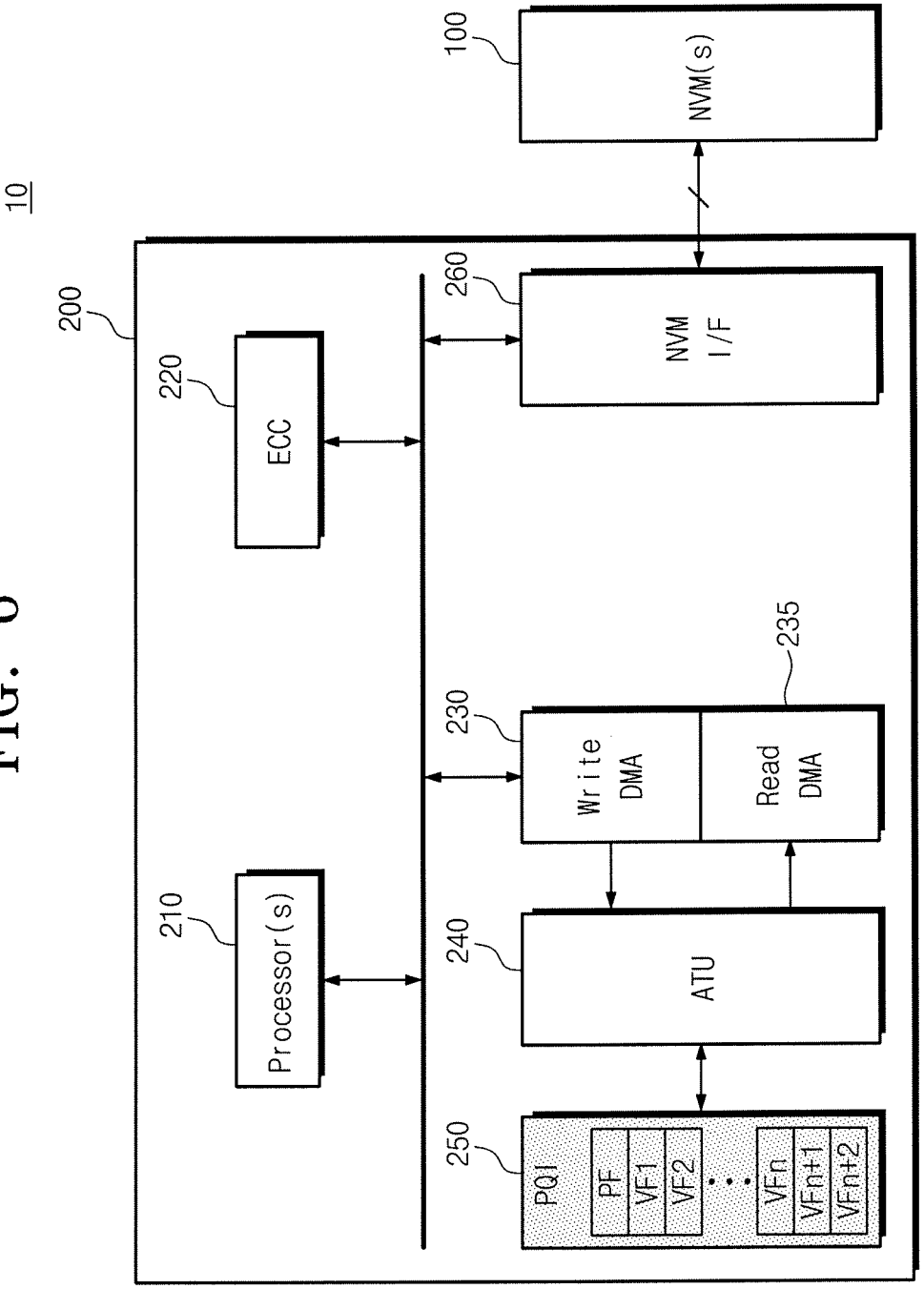
FIG. 6 illustrates a storage device according to an exemplary embodiment of the present inventive concept.

FIG. 6 illustrates a storage device 10 according to an exemplary embodiment of the present inventive concept. As illustrated in FIG. 6, the storage device 10 includes at least one nonvolatile memory (NVM) 100 and a memory controller 200.

The at least one nonvolatile memory device 100 may be implemented with the nonvolatile memory device 1310 shown in FIG. 1. In an exemplary embodiment, the nonvolatile memory device 100 may be configured to receive a high voltage from an external device.

The memory controller 200 may be connected to the nonvolatile memory device 100 through at least one channel. The memory controller 200 includes at least one processor 210, an error correction circuit (ECC) 220, a write DMA circuit 230, a read DMA circuit 235, an address translation unit (ATU) 240, a host interface 250, and a nonvolatile memory interface 260.

The error correction circuit 220 may calculate an error correction code value of data to be programmed into, e.g., the nonvolatile memory device 100 during a write operation, correct an error of data read from, e.g., the nonvolatile memory device 100 during a read operation based on the error correction code value, and correct an error of data recovered from the nonvolatile memory device 100 during a data recovery operation based on the error correction code value. The error correction circuit 220 may generate an error correction code (ECC) to correct a fail bit or an error bit of data input from the nonvolatile memory device 100. The error correction circuit 220 may perform error correction encoding on data provided from the nonvolatile memory device 100 to generate data to which a parity bit is added. The parity bit may be stored in the nonvolatile memory device 100.

In addition, the error correction circuit 220 may perform error correction encoding on data output from the nonvolatile memory device 100. The error correction circuit 220 may correct an error of data using a parity bit. In an exemplary embodiment, the error correction circuit 220 may correct an error of data using coding schemes such as low density parity check (LDPC) code, BCH code, turbo code, Reed-Solomon code, convolution code, recursive systematic code (RSC), trellis-coded modulation (TCM), block coded modulation (BCM), or the like.

A code memory may be further provided to store data required for operation of the memory controller 200. The code memory may be implemented with a nonvolatile memory device.

The write DMA circuit 230 is a circuit that directly writes data (e.g., MAP table) into a host buffer memory (e.g., 1200 of FIG. 1, 2200 of FIG. 3, 3200 of FIG. 4, or 4200 of FIG. 5). The read DMA circuit 235 is a circuit that directly reads data (e.g., MAP table) from the host buffer memory (e.g., 1200 of FIG. 1, 2200 of FIG. 3, 3200 of FIG. 4, or 4200 of FIG. 5). The address translation unit 240 may set an address corresponding to an area of the host buffer memory 1200 viewed by the storage device 10.

The host interface 250 may provide an interface function with an external device. The host interface 250 may be implemented with an interface (e.g., NVMe, PQI, or the like) that supports a virtualization function. For example, the host interface 250 may be implemented with at least one of the interface circuits (e.g., 1321, 2321, 3321, and 4321), respectively, shown in FIGS. 1, 3, 4, and 5.

The nonvolatile memory interface 260 may provide an interface function with the nonvolatile memory device 100.

The memory controller 200 may have a wireless communication function (e.g., WiFi).

The memory controller 200 may include a buffer memory to temporarily store data required for operation of the memory controller 200.

Figure 7:
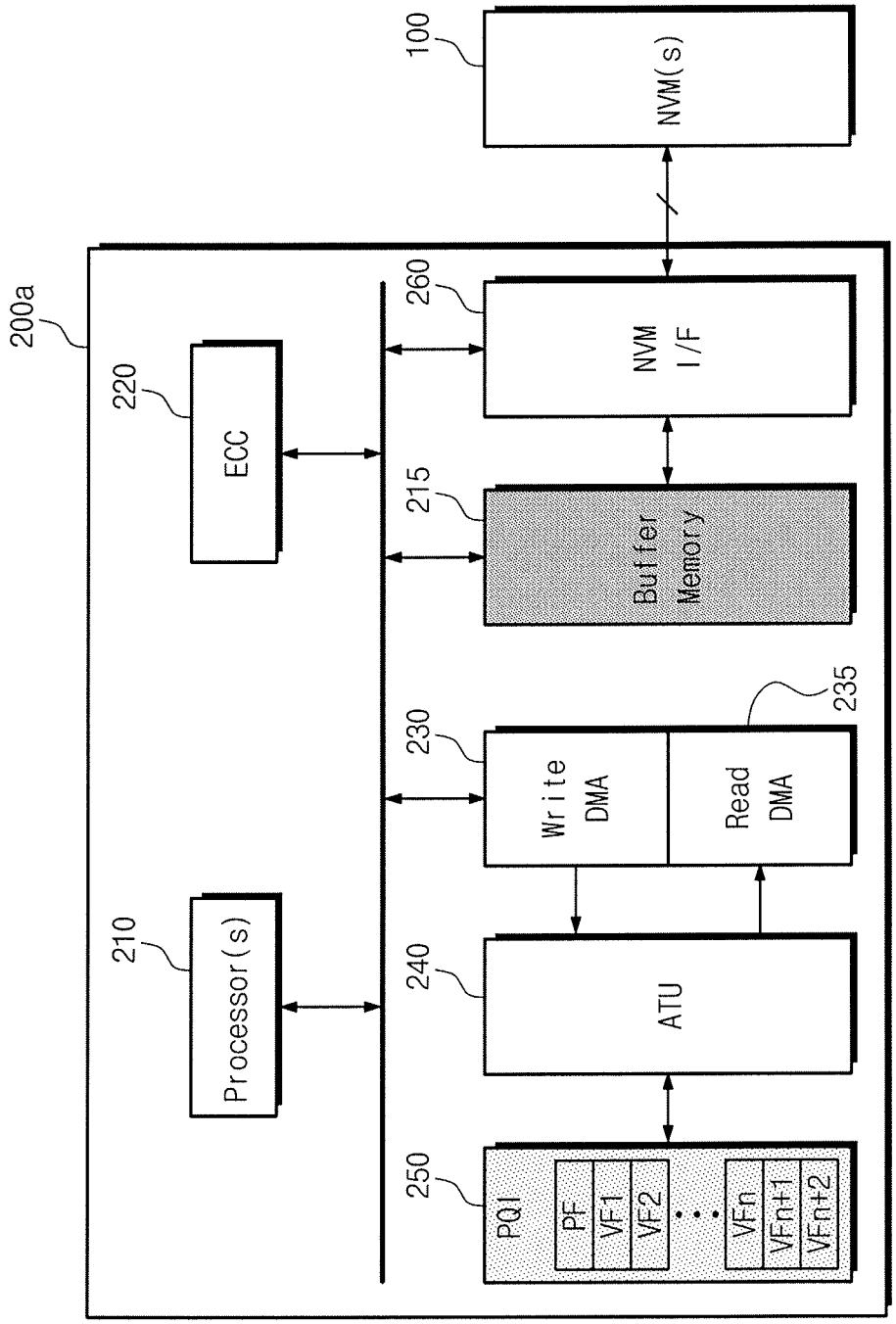
FIG. 7 illustrates a storage device according to an exemplary embodiment of the present inventive concept.

FIG. 7 illustrates a storage device 20 according to an exemplary embodiment of the present inventive concept. As illustrated in FIG. 7, the storage device 20 includes at least one nonvolatile memory device 100 and a memory controller 200a. In addition to the nonvolatile controller 200 shown in FIG. 6, the memory controller 200a further includes a buffer memory 215. The buffer memory 215 may temporarily store data in the nonvolatile memory device 100 during read/write operations. The buffer memory 215 may include a plurality of memory lines to store data or a command. The memory lines may be mapped to cache lines in various manners. In an exemplary embodiment, the buffer memory 215 may be implemented with a static random access memory (SRAM). In an exemplary embodiment, the buffer memory 215 may store some of data stored in the host buffer memory (e.g., 1200 of FIG. 1) or the entirety or a portion of a map table to manage the nonvolatile memory device 100. For example, the memory controller 200a of FIG. 7 may have substantially the same configuration and structure as those of the memory controller 200 of FIG. 6 except that the memory controller of FIG. 7 further includes the buffer memory 215. Thus, duplicate descriptions will be omitted.

Figure 8:
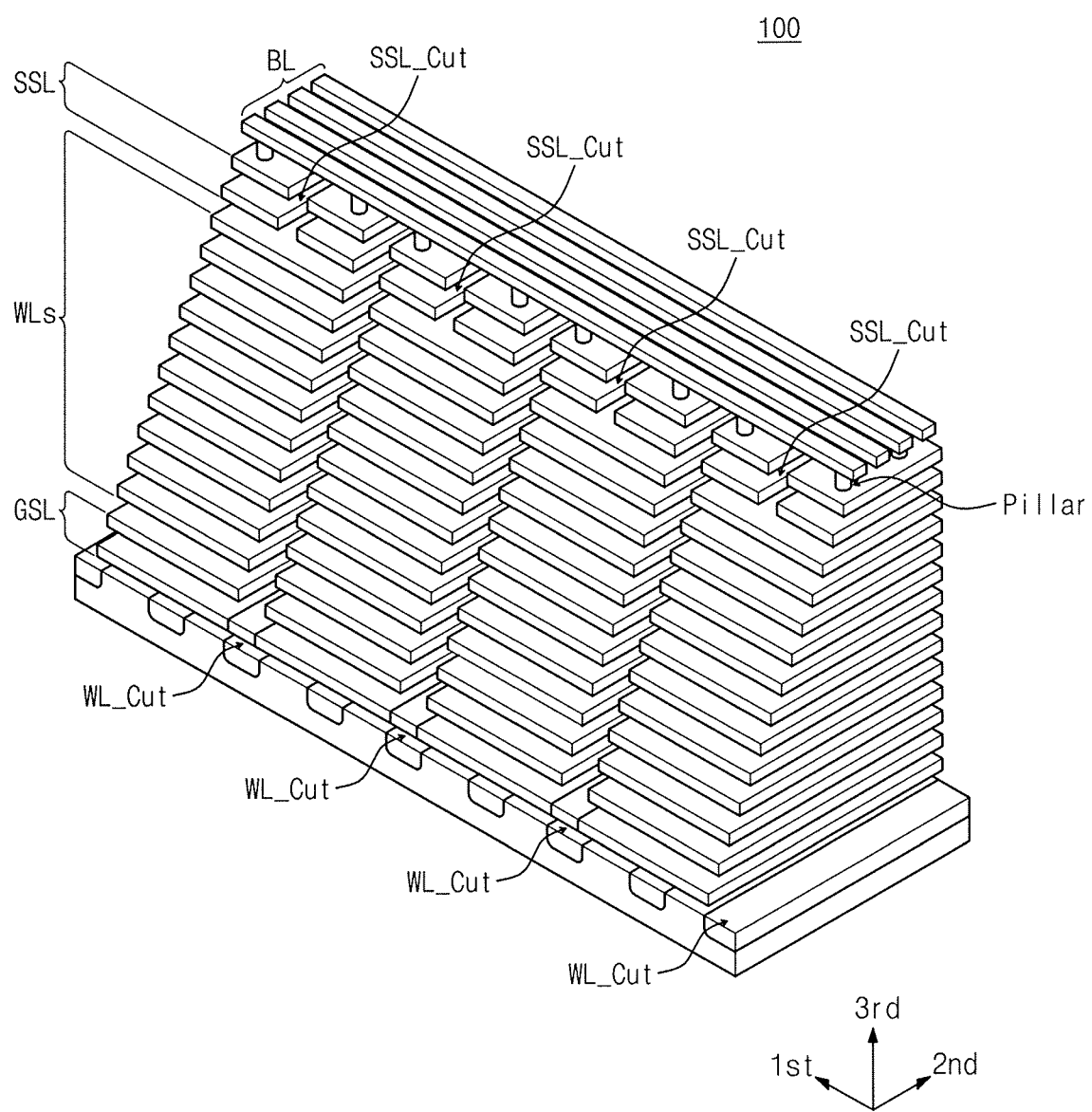
FIG. 8 is a block diagram of a nonvolatile memory device according to an exemplary embodiment of the present inventive concept.

FIG. 8 is a block diagram of a nonvolatile memory device 100 according to an exemplary embodiment of the present inventive concept. As illustrated in FIG. 8, the nonvolatile memory device 100 may include at least one memory block BLK. The at least one memory block BLK may include four sub-blocks SBLK1 to SBLK4 disposed on a substrate. Each of the sub-blocks SBLK1 to SBLK4 is formed by stacking at least one ground selection line GSL, a plurality of wordlines WLs, and at least one string selection line SSL in the plate form within an area between wordline cuts on the substrate. For example, the sub-blocks SBLK1 to SBLK4 are separated one from another by a corresponding one of the wordline cuts WL_Cut. The at least one string selection line SSL is separated by a string selection line cut SSL_Cut. Although a string selection line cut SSL_Cut exists in FIG. 8, a memory block according to an exemplary embodiment of the present inventive concept is not limited thereto. A memory block according to an exemplary embodiment of the present inventive concept may be implemented such that a string selection line cut does not exist.

In an exemplary embodiment, at least one dummy wordline may be stacked within an area between the ground selection line GSL and the wordlines WLs in the plate form. In an exemplary embodiment, at least one dummy wordline may be stacked within an area between the wordlines WLs and the string selection line SSL in the plate form.

Each of the wordlines cuts WL_Cut includes a common source line. In an exemplary embodiment, each of the wordline cuts WL_Cut may include a common source line. The common source lines in the wordline cuts WL_Cut are connected in common. In addition, a pillar may penetrate the at least one ground selection line GSL, the wordlines WLs, and the at least one string selection line SSL to form a string, and the pillar may be connected to a bit line BL.

In FIG. 8, a portion formed in an area between wordline cuts WL_Cut is illustrated as a sub-block. However, exemplary embodiments of the present inventive concept are not limited thereto. A portion formed in an area between a wordline cut WL_Cut and a string selection line cut SSL_Cut may be defined as a sub-block.

A memory block according to an exemplary embodiment of the present inventive concept may have a merged wordline structure in which two word lines WLs are merged into one.

An exemplary embodiment of the present inventive concept may be applied to a universal flash storage (UFS).

Figure 9:
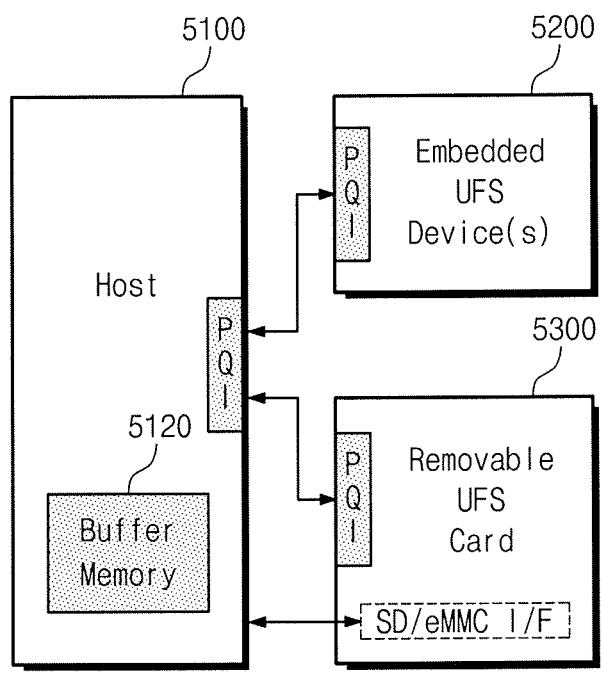
FIG. 9 is a block diagram of a universal flash storage (UFS) system according to an exemplary embodiment of the present inventive concept.

FIG. 9 is a block diagram of a UFS system 5000 according to an exemplary embodiment of the present inventive concept. As illustrated in FIG. 9, the UFS system 5000 may include a host 5100, at least one embedded UFS device 5200, and a removable UFS card 5300. Communication between the host 5100 and the embedded UFS device 5200 and communication between the host 5100 and the removable UFS card 5300 may be performed through a virtualization interface (e.g., PQI) that supports a virtualization function.

The host 5100 may be implemented with at least one of the host devices (e.g., 1100, 2100, 3100, and 4100) shown in FIGS. 1 to 6 or a combination of at least of the host devices and a host buffer memory (e.g., 1200, 2200, 3200, 4200, or 5120). For example, the host 5100 may include a buffer memory 5120. The buffer memory 5120 may store a queue and a map table required for an input/output virtualization operation. The host 5100 may include a bridge that supports communication by a protocol other than a UFS protocol. Communication between the UFS host 5100 and the removable UFS card 5300 may be performed by various card protocols (e.g., UFDs, MMC, eMMC secure digital (SD), mini SD, micro SD, etc.).

At least one of the embedded UFS device 5200 and the removable UFS card 5300 may be implemented with the storage device 100 shown in FIG. 8 or the storage device 200 shown in FIG. 9.

In FIG. 9, the buffer memory 5120 exists inside the host 5100. However, exemplary embodiments of the present inventive concept are not limited thereto. The buffer memory 5120 may exist outside the host 5100 in the form of an embedded multi-chip package (eMCP).

Figure 10:
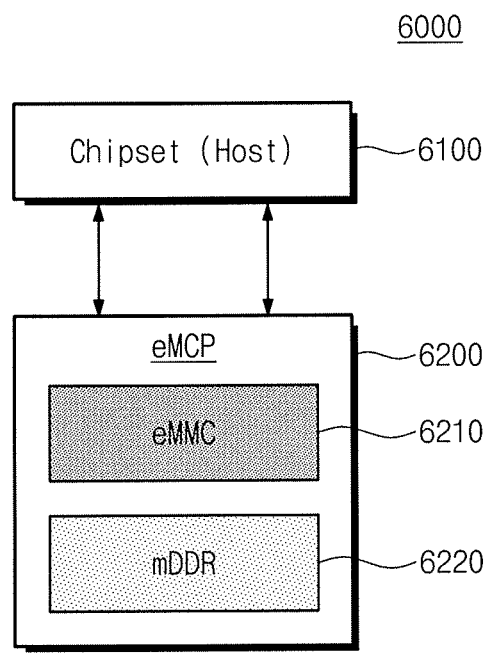
FIG. 10 illustrates a host system adopting an embedded multi-chip package (eMCP) according to an exemplary embodiment of the present inventive concept.

FIG. 10 illustrates a host system 6000 adopting an eMCP according to an exemplary embodiment of the present inventive concept. As illustrated in FIG. 10, the host system 6000 includes a chipset 6100 and an eMCP 6200.

The eMCP 6200 includes an eMMC 6210 and a mobile double data rate (mDDR) memory device 6220 which are formed in a single package. The eMMC 6210 may be implemented with the storage device 10 shown in FIG. 7 or the storage device 20 shown in FIG. 9. The mDDR memory device 6220 may be implemented with a mobile-only synchronous dynamic random access memory (SDRAM), and the mDDR memory device 6220 may perform a host buffer memory function described in FIGS. 1 to 6.

Virtualization functions of a storage device including a processor have been described with reference to FIGS. 1 to 10. However, exemplary embodiments of the present inventive concept are not limited thereto. An exemplary embodiment of the present inventive concept may be applied to a chipset that directly controls a single NAND flash memory device that does not include a processor.

Figure 11:
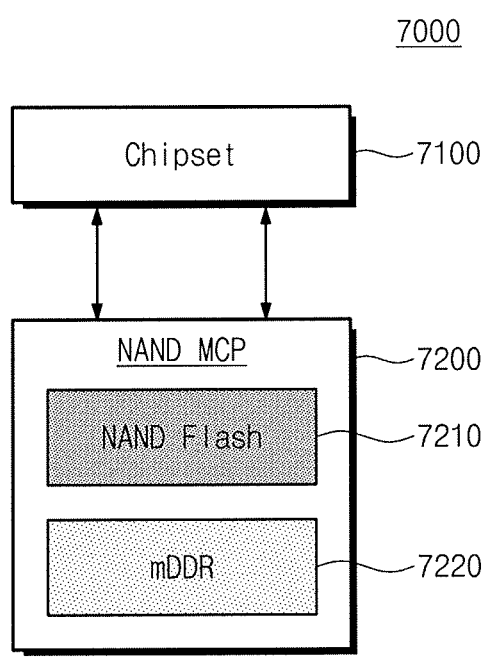
FIG. 11 illustrates a host system including a negative AND multi-chip package (NAND MCP) according to an exemplary embodiment of the present inventive concept.

FIG. 11 illustrates a host system 7000 including a NAND multi-chip package (MCP) according to an exemplary embodiment of the present inventive concept. As illustrated in FIG. 11, the host system 7000 includes a chipset 7100 and a NAND MCP 7200. The chipset 7100 may support a virtualization function for a plurality of cores in the chipset 7100. The chipset 7100 may manage each of the NAND flash memory device 7210 and the mDDR memory device 7220. The NAND flash memory device 7210 and the mDDR memory device 7220 may be formed in a single package. The NAND flash memory device 7210 may be implemented with at least one of NAND flash memory and VNAND flash memory. The mDDR memory device 7220 may be a mobile-only synchronous dynamic random access memory (SDRAM).

Figure 12:
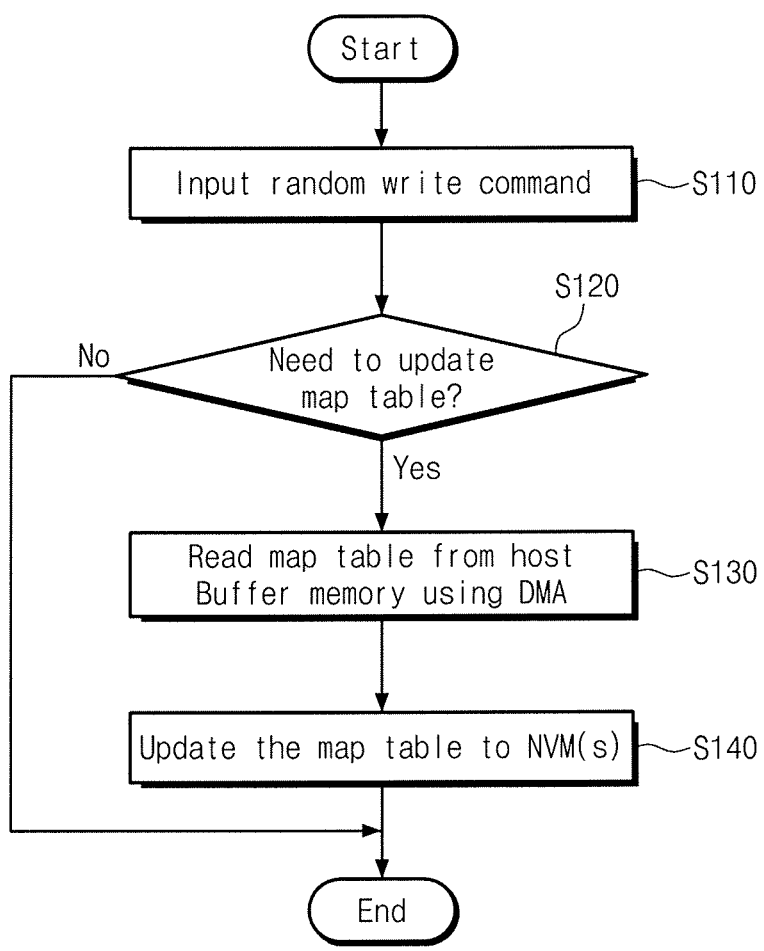
FIG. 12 is a flowchart illustrating a map table updating method of a storage device according to an exemplary embodiment of the present inventive concept.

FIG. 12 is a flowchart illustrating a map table updating method of a storage device according to an exemplary embodiment of the present inventive concept. A random write command is input from a host (S110). When a write operation is performed according to the input random write command, whether a map table needs to be updated is determined (S120). When the map table needs to be updated, the map table is read using a DMA circuit and is provided to a host buffer memory (e.g., 1200, 2200, 3200, 4200, or 5120) (S130). The read map table is updated to a nonvolatile memory device (e.g., 1310). When the map table need not be updated, an update operation is terminated.

Figure 13:
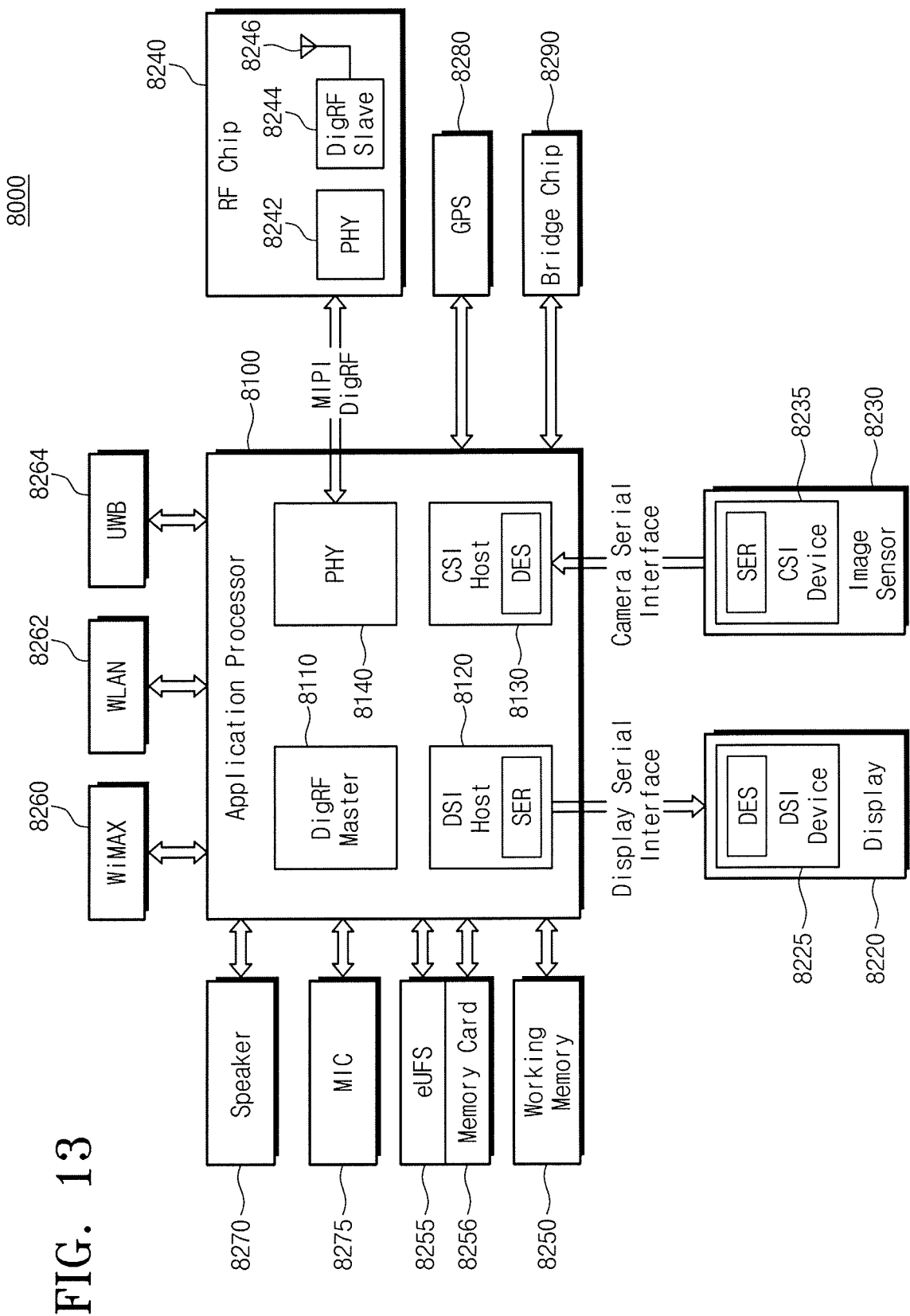
FIG. 13 is a block diagram of a mobile device according to an exemplary embodiment of the present inventive concept.

FIG. 13 is a block diagram of a mobile device 8000 according to an exemplary embodiment of the present inventive concept. The mobile device 8000 may be implemented with a data processing device that may use or support an interface proposed by the MIPI Alliance. For example, the mobile device 8000 may be implemented in the form of a personal digital assistant (PDA), a portable multimedia player (PMP), a smartphone a wearable device, or the like.

The mobile device 8000 may include an application processor 8100, a display 8220, and an image sensor 8230. The application processor 8100 may include a DigRF master 8110, a display serial interface (DSI) host 8120, a camera serial interface (CSI) host 8130, and a physical layer 8140.

The DSI host 8120 may communicate with a DSI device 8225 of the display 8220 according to a DSI. For example, an optical serializer SER may be implemented in the DSI host 8120, and an optical deserializer DES may be implemented in the DSI device 8225.

The CSI host 8130 may communicate with a CSI device 8235 of the image sensor 8230 according to a CSI. For example, an optical deserializer DES may be implemented in the CSI host 8130, and an optical serializer SER may be implemented in the CSI device 3235. The DSI and the CSI may use a physical layer and a link layer.

The mobile device 8000 may further include a radio-frequency (RF) chip 8240 that communicates with the application processor 8100. The RF chip 8240 may include a physical layer 8242, a DigRF slave 8244, and an antenna 8246. For example, the physical layer 8242 of the RF chip 8240 and the physical layer 8140 of the application processor 8100 may exchange data by using a DigRF interface proposed by the MIPI Alliance.

The mobile device 8000 may further include a working memory 8250, an embedded storage device (e.g., eUFS) 8255, and a memory card (e.g., UFS card) 8256. The working memory 8250, the embedded storage device 8255, and the memory card 8256 may store data received from the application processor 8100. The working memory 8250, the embedded storage device 8255, and the memory card 8256 may provide stored data to the application processor 8100.

The working memory 8250 may temporarily store data that has been processed by the application processor 8100 or that will be processed by the application processor 8100. The working memory 8250 may include a volatile memory such as SRAM, DRAM, SDRAM, or the like, or a nonvolatile memory such as flash memory, PRAM, MRAM, RRAM, FRAM, or the like. The working memory 8250 may store a command queue and a map table as described with reference to FIGS. 1 to 12.

The embedded storage device 8255 and the memory card 8256 may each store data irrespective of whether power is supplied. In an exemplary embodiment, the embedded storage device 8255 and the memory card 8256 may operate based on the UFS interface protocol. For example, each of the embedded storage device 8255 and the memory card 8256 may support a virtualization function, may not include a buffer memory to store a map table required for the virtualization function, and may communicate with the application processor 8100 according to a link layer configuration, as described with reference to FIGS. 1 to 12. The application processor 8100 may simultaneously control the embedded storage device 8255 and the memory card 8256 through a single UFS interface.

The mobile device 8000 may communicate with an external system through world interoperability for microwave access (WiMAX) 8260, wireless local area network (WLAN) 8262, ultra wideband (UWB) 8264, or the like.

The mobile device 8000 may further include a speaker 8270 and a microphone 8275 to process voice information. The mobile device 8000 may further include a global positioning system (GPS) 8280 to process position information.

The mobile device 8000 may further include a bridge chip 8290 to manage connection to peripheral devices. In an exemplary embodiment, the bridge chip 8290 may operate based on united protocol (UniPro) and M-PHY interface protocols.

The above-described host interface (e.g., 250 of FIG. 6) processes homogeneous or heterogeneous storage devices at the same time. However, exemplary embodiments of the present inventive concepts are not limited thereto. In an exemplary embodiment, the host interface may process a storage device, a device (e.g., display device) other than the storage device, and/or other devices using the same communication protocol as than storage devices at the same time.

A memory system or a storage device according to an exemplary embodiment of the present inventive concept may be packaged in various manners and embedded. For example, the memory system or the storage device may be packaged by at least one of package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flatpack (TQFP), small outline (SOIC), shrink small outline package (SSOP), thin small outline (TSOP), system in package (SIP), multi chip package (MCP), wafer-level fabricated package (WFP), and wafer-level processed stack package (WSP).

As described above, a host system according to an exemplary embodiment of the present inventive concept may use a plurality of cores in performing an input/output virtualization operation, and store a map table required for the input/output virtualization operation in a host buffer memory, and thus, the overall system performance is increased. For example, since a storage device uses the host buffer memory during a IO virtualization operation, the storage device might not include a high-capacity buffer memory. Thus, the fabrication cost of the storage device may be reduced and a chip size may also be reduced.

While exemplary embodiments of the present inventive concept have been particularly shown and described, it will be understood that various changes in form and detail may be made therein without departing from the spirit and scope of the present inventive concept as defined by the following claims.

What is claimed is:

1. A storage device that communicates with an external host device, the storage device comprising:
    a nonvolatile memory device that includes memory blocks; and
    a memory controller, the memory controller comprising:
        a processor that processes at least one command from the external host device;
        a physical function controller that controls a first input/output operation using the processor;
        a virtual function controller that controls a second input/output operation using a core of the external host device, the second input/output operation corresponding to a virtualization operation;
        an address translation unit that sets a first physical address indicative of a host buffer memory of the external host device and that differs from a second physical address of the nonvolatile memory device;
        a write direct memory access (DMA) circuit that writes a first map table used for a first address translation of the first input/output operation and a second map table used for a second address translation of the second input/output operation to the host buffer memory of the external host device, based on the first physical address set by the address translation unit;
        a read DMA circuit that reads the first map table and the second map table of the host buffer memory, which are updated according to the at least one command, based on the first physical address set by the address translation unit; and
        a nonvolatile memory interface that stores the first map table and the second map table read by the read DMA circuit to the nonvolatile memory device.

2. The storage device of claim 1, wherein the physical function controller
    fetches the at least one command from a first submission queue of the host buffer memory after the at least one command is written to the first submission queue of the host buffer memory,
    writes a first completion to a first completion queue of the host buffer memory after the at least one command is processed by the processor, and
    generates a first interrupt to the external host device.

3. The storage device of claim 2, wherein the virtual function controller
    fetches the at least one command from a second submission queue of the host buffer memory after the at least one command is written to the second submission queue of the host buffer memory,
    writes a second completion to a second completion queue of the host buffer memory after the at least one command is processed by the processor, and
    generates an second interrupt to the external host device.

4. The storage device of claim 3, wherein the first address translation and the second address translation are associated with a logical address of the external host device and the second physical address of the nonvolatile memory device.

5. The storage device of claim 1, wherein each of the virtual function controller and the physical function controller is based on at least one of nonvolatile memory express (NVMe), peripheral component interconnect express queuing interface (PQI), serial advanced technology attachment express (SATAe), or low latency interface (LLI).

6. The storage device of claim 1, wherein the memory controller further comprises a buffer memory that stores a portion of a first map table and a second map table stored in the host buffer memory of the external host device.

7. The storage device of claim 1, wherein the memory controller further comprises an error correction circuit that performs error correction on data for the nonvolatile memory device.

8. The storage device of claim 1, wherein the storage device is a universal flash storage (UFS).

9. The storage device of claim 1, wherein the virtual function controller is a first virtual function controller and the core is a first core, and the memory controller further includes a second virtual function controller that controls a third input/output operation using a second core of the external host device, the third input/output operation corresponding to the virtualization operation.

10. The storage device of claim 9, wherein the write DMA circuit writes a third map table used for a third address translation of the third input/output operation to the host buffer memory of the external host device, based on the first physical address set by the address translation unit, the read DMA circuit reads the third map table of the host buffer memory which is updated according to the at least one command, based on the first physical address set by the address translation unit, and the nonvolatile memory interface stores the third map table read by the read DMA circuit to the nonvolatile memory device.

11. The storage device of claim 10, wherein the second virtual function controller fetches the at least one command from a third submission queue of the host buffer memory after the at least one command is written to the third submission queue of the host buffer memory, writes a third completion to a third completion queue of the host buffer memory after the at least one command is processed by the processor, and generates an third interrupt to the external host device.

12. The storage device of claim 11, wherein the first virtual function controller and the second virtual function controller correspond to a multi-root (MR) input/output virtualization function.

13. A storage device that communicates with an external host device, comprising:

a nonvolatile memory device; and a memory controller that includes a processor, wherein the memory controller controls a first input/output operation using the processor;

controls a second input/output operation using a first core of the external host device, the second input/output operation corresponding to a virtualization operation;

controls a third input/output operation using a second core of the external host device, the third input/output operation corresponding to the virtualization operation;

set a first physical address which indicates a host buffer memory of the external host device and is different from a second physical address of the nonvolatile memory device;

writes a first map table used for a first address translation of the first input/output operation, a second map table used for a second address translation of the second input/output operation, and a third map table used for a third address translation of the third input/output operation to the host buffer memory of the external host device, based on the first physical address;

reads the first map table, the second map table, and the third map table of the host buffer memory which are updated according to at least one command of the external host device, based on the first physical address; and stores the first map table, the second map table, and the third map table read from the host buffer memory to the nonvolatile memory device.

14. The storage device of claim 13, wherein the memory controller fetches the at least one command from a first submission queue, a second submission queue, and a third submission queue of the host buffer memory, respectively;

writes a first completion, a second completion, and a third completion to a first completion queue, a second completion queue, and a third completion queue of the host buffer memory after the at least one command is processed by the processor, respectively; and generates a first interrupt, a second interrupt, and a third interrupt to the external host device, respectively.

15. The storage device of claim 13, wherein the first address translation, the second address translation, and the third address translation are associated with a logical address of the external host device and the second physical address of the nonvolatile memory device.

16. A method of operating a storage device that communicates with an external host device, the method comprising:

performing a first input/output operation and a second input/output operation, the second input/output operation corresponding to a virtualization operation;

setting a first physical address which indicates a host buffer memory of the external host device and is different from a second physical address of a nonvolatile memory device of the storage device;

writing a first map table used for a first address translation of the first input/output operation and a second map table used for a second address translation of the second input/output operation to the host buffer memory of the external host device, based on the first physical address;

determining whether the first map table and the second map table stored in the host buffer memory need to be updated;

in response to determining that the first map table and the second map table need to be updated, reading the first map table and the second map table of the host buffer memory which are updated according to at least one command of the external host device, based on the first physical address; and storing the first map table and the second map table read from the host buffer memory to the nonvolatile memory device.

17. The method of claim 16, wherein performing the first input/output operation and the second input/output operation comprises:

using a processor of a memory controller of the storage device for the first input/output operation; and using a core of the external host device for the second input/output operation.

18. The method of claim 17, wherein performing the first input/output operation and the second input/output operation further comprises:

fetching the at least one command from a first submission queue and a second submission queue of the host buffer memory, respectively;

writing a first completion and a second completion to a first completion queue and a second completion queue of the host buffer memory after the at least one command is processed by the processor, respectively; and generating a first interrupt and a second interrupt to the external host device, respectively.

19. The method of claim 16, wherein the first address translation and the second address translation are associated with a logical address of the external host device and the second physical address of the nonvolatile memory device.

20. The method of claim 16, further comprising performing error correction on data for the nonvolatile memory device.

* * * * *